United States Patent [19]
Allegro

[11] Patent Number: 5,022,381
[45] Date of Patent: Jun. 11, 1991

[54] BARREL-SHAPED SOLAR ROOFING ELEMENT AND METHOD FOR ITS ASSEMBLY

[76] Inventor: Joseph Allegro, Inner Solar Roof System, Inc., 731 NE. 69th St., Boca Rotan, Fla. 33487

[21] Appl. No.: 497,308

[22] Filed: Mar. 22, 1990

Related U.S. Application Data

[63] Continuation-in-part of Ser. No. 408,727, Sep. 18, 1989, Pat. No. 4,953,537.

[51] Int. Cl.⁵ .............................................. F24J 2/04
[52] U.S. Cl. ............................ 126/432; 126/DIG. 2; 52/173 R; 83/920; 136/248; 136/251; 136/291
[58] Field of Search ....................... 136/248, 251, 291; 126/432, DIG. 2; 52/173 R, 533, 518, 552, 553; 83/920

[56] References Cited

U.S. PATENT DOCUMENTS

| | | | |
|---|---|---|---|
| 4,040,867 | 8/1977 | Forestieri et al. | 136/244 |
| 4,144,874 | 3/1979 | Zebuhr | 126/448 |
| 4,428,361 | 1/1984 | Straza | 126/432 |

FOREIGN PATENT DOCUMENTS

| | | | |
|---|---|---|---|
| 2807487 | 8/1979 | Fed. Rep. of Germany | 126/DIG. 2 |
| 2481426 | 10/1981 | France | 126/DIG. 2 |

*Primary Examiner*—Aaron Weisstuch
*Attorney, Agent, or Firm*—Laurence R. Brown

[57] ABSTRACT

Shingles are formed of a top sheet and a bottom sheet of plastic confining solar energy conversion means therebetween. The sheets are sealed together about a perimeter to form flanges for fastening in overlapped order to a roof. The contour of the shingles is domed to provide for better solar energy conversion efficiencies. Insulation and support members disposed along an underside of the dome sructure provide support to the assembly and insulate the roof. Decorative structure and shingles of this nature permit a roof surface which does not belie its nature as a solar heating system. The plastic sheets may either form flow passageways for a solar heatable fluid or may encompass photovoltaic cells to form unitary shingle-solar conversion structure.

17 Claims, 2 Drawing Sheets

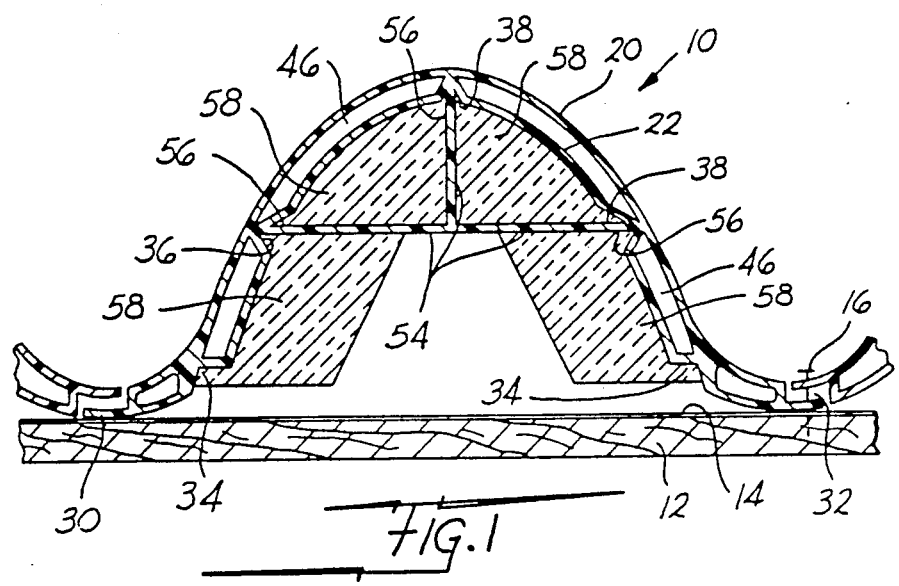
Fig. 1
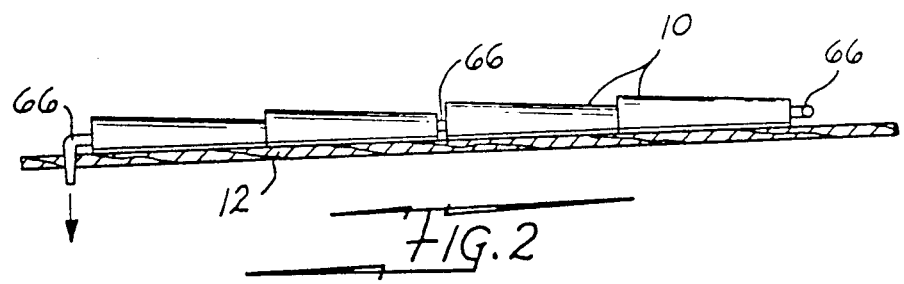
Fig. 2
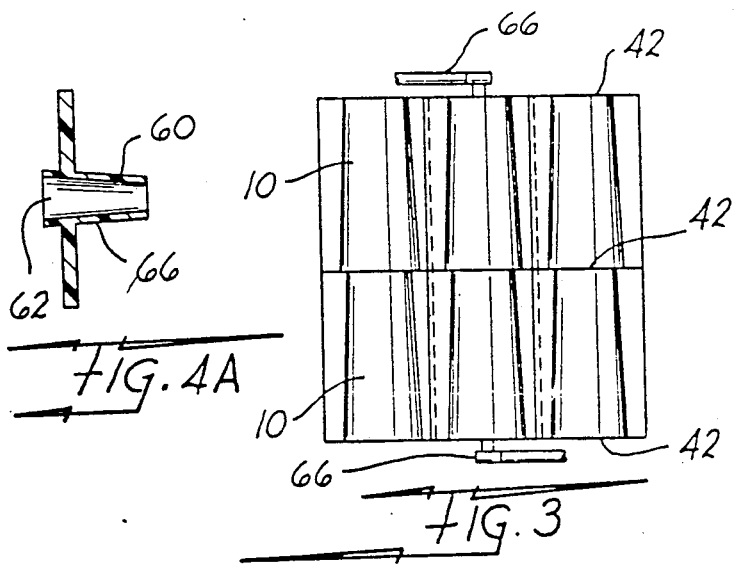
Fig. 4A
Fig. 3
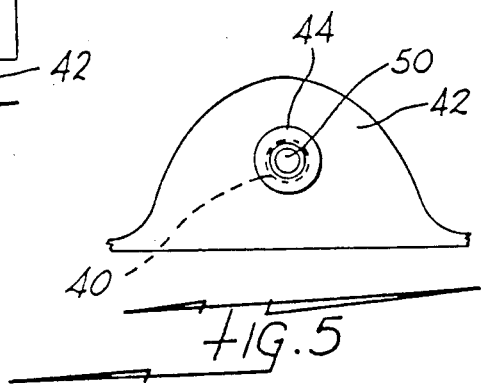
Fig. 5

1

BARREL-SHAPED SOLAR ROOFING ELEMENT AND METHOD FOR ITS ASSEMBLY

BACKGROUND OF THE INVENTION

Field of the Invention

This application is a continuation-in-part of my application Ser. No. 07/408,727 entitled BARREL SHAPED SOLAR ROOF ELEMENT AND METHOD FOR ITS MANUFACTURE, filed Sept. 18, 1989 now U.S. Pat. No. 4,953,537 granted Sept. 4, 1990 and the text and entire disclosure thereof is incorporated herein by reference.

TECHNICAL FIELD

The invention relates to improved solar roof assemblies with combination roofing-solar elements being mounted in a panel of interconnected roofing elements assembled as a solar collector system. The invention more specifically relates to barrel-shaped solar roofing elements consisting of two separated sheets of extruded plastic for forming a solar roofing shingle-like e element.

BACKGROUND ART

Various prior art solar energy panels and systems and devices, and the like, as well as apparatus and method of their construction in general, are found to be known, and exemplary of the U.S. prior art are the following:

Allegro, U.S. Pat. No. 4,146,014, Mar. 27. 1979
Allegro, U.S. Pat. No. 4,158,357, Jun. 19,1979
Allegro, U.S. Pat. No. 4,953,537, Sept. 4,1990

U.S. Pat. No. '014 teaches the concept of using shingles as a part of a solar heat exchange fluid system. U.S. Pat. No. '357 shows that energy panels may be distributed along a slope of a roof while serving substantially as overlapped shingles. U.S. Pat. No. '537 shows a generally barrel-shaped section of molded plastic formed of two spaced plastic sheets for concentrating more solar energy generally toward an internal conduit or passway for water or other heat exchange fluid than feasible with flat shingles.

Other solar energy system art is well known. However, no prior art has produced an effective solar system from roofing shingles competitively priced and visually commensurate with standard roofing. The use of either fluid flow systems or electrolytic solar panels on the roof in the prior art provided in general drastic departures from the conventional roof lines as appendages superimposed over roofing. Cost becomes excessive when the solar system overlies standard roofing. One problem that has prevented the shingles themselves from being an integrated part of a solar energy fluid or electrolytic system is the prior art incompatibility between the two elements and the very high cost of roofing elements such as shingles that could be used for the dual functions of roofing and heat concentration for a solar collection system.

DISCLOSURE OF THE INVENTION

Other objects, advantages, and features of the present invention are found throughout this specification. A general objective is to correct the foregoing deficiencies in the prior art by providing an economically feasible roofing element that serves both the function of a shingle and that of a heat concentrator for a solar energy system.

Roofing shingle elements also serving as solar energy concentration means are made from two sheets of plastic sheet material, preferably extruded as preformed, rectangular roof section elements with solar heating system features embedded in each element. Thus, either a liquid flow pathway is provided between the sheets or electrolytic solar responsive cells. The underside contacting the roof comprises structural insulation such as plastic ribbing surrounded by foam backing. Shingle overlap tabs can be securably mounted on a plywood and a tar paper covered roof structure by nailing. A barrel shaped hump provides a large surface area with small footprint to collect more solar energy than possible with flat shingles.

The two plastic sheets are sealed together by ribs defining flow paths and about a perimeter of the solar energy collection area presented. Plastic ribbing within a barrel-like hump lends structural support.

Exterior surfaces of the shingles are artistically styled, and durably constructed to serve a long life without servicing or replacement. The individual shingles are connected into a solar collector system that can visibly appear to be a standard roof. Usually the north side of a roof is covered with conventional tile, shingles, or the like, and little difference is observed between construction of noth and south side exposures without a very close inspection.

The shingle-solar collector element is fabricated by twin sheets of plastic material into preformed rectangular roof sections with the solar heating system elements embedded in each shingle and with suitable system interconnection fittings on the units. Each fluid flow collector is typically connected in a PVC pipe system and each photovoltaic solar conversion unit is electrically connected for current flow.

Analytical review of the results of testing of the device of the invention has found a steady state efficiency and general properties of the system showing that solar collectors of the invention turn large amount of incident sunlight into useful heat energy. Although of primary advantage for new roof construction, retrofit installations also provide significant economy when a solar system is installed when the roof needs to be replaced.

BRIEF DESCRIPTION OF THE DRAWINGS

In the several views, like reference characters are used to permit comparison between similar features.

FIG. 1 shows a sectional view of an improved hump-shaped solar roofing assembly or element according to a preferred embodiment and best mode of the present invention.

FIG. 2 is a side elevation view of a plurality of the roofing elements connected together and shown in place on a roof structure.

FIG. 3 is a top and plan view of a plurality of the roofing elements shown on a reduced scale.

FIGS. 4A and 4B are sectional detail views of a coupling manifold as used between any several of the roofing elements.

FIG. 5 is a smaller sectional view of an end view of a roofing element and depicting a feature of a coupling flange of the invention.

THE PREFERRED EMBODIMENTS

Figure 4B:
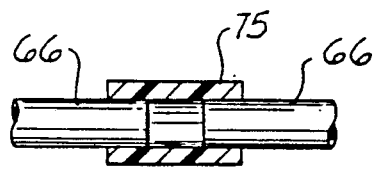

Referring now to FIGS. 1 to 3, solar roofing elements 10, constructed in a barrel or hump shaped configuration are supportably mounted on a roof base of plywood 12 shown covered by a sheet of tar paper 14, wherein the roofing element 10 is secured to the plywood 12 by nails 16.

The roofing element 10, in this embodiment for providing a solar heatable liquid flow path, is preferably a co-extruded two sheet assembly comprising a top extruded contoured sheet 20 of processes thermo formed polymer, preferably a polyvinyl chloride (PVC) material such as B. F. Goodrich brand "CPVC #3206" compound, and a spacedly disposed bottom extruded contoured sheet 22 of the same kind of material. The sheets are sealed and welded integrally together about and throughout the perimeter thereof at perimeter flaps 30, 32, as well as at several intermediate grooves or detents 34, 36, 38, each being spaciously disposed along an underside of the bottom sheet shown in FIG. 1. These provide plastic ribs additionally increasing operational efficiency by producing turbulence in flow paths that intermix the warmer layers, etc., and strengthening the thinner plastic sheet structure.

Coupling flange apertures or holes 40 are formed in an end panel flap 42 inside a flanged outer rim shown in FIG. 5. The rim 44 may be glued or spin welded to rib welded structure forming the holes 40 in opposite ends 42, 42 of the roofing elements 10.

The set of extruded contoured sheets 20, 22 formed preferably by a co-extrusion step take a contoured humped profile forming a larger surface area solar collector surface on a smaller shingle sized footprint for better solar heating efficiency.

In the solar roofing element 10 and at the detents or grooves 34, 36, 38, at which the sheets 20, 22 of the element 10 are sealed together, formed internally between the top sheet 20 and the bottom sheet 22 are flow pathways 46 that intercouple with end apertures 40. The flow pathway 46 provides a conduit for flow of solar heatable liquid throughout the entire humped area of the roofing element 10 having an outer plastic layer 20 which is transparent and readily conductive to solar energy, thereby to produce good heating efficiency. The bottom sheet 22 may be a thicker sheet having heat insulating characteristics.

the flange ring preferably provides for a flexing coupling transition ring forming an expansion and contraction mechanism in the end panel 42 to preserve its flexural strength, which should be in the order of 3,160 psi. This provides for normal expansion and contraction of the shingles with changes of temperature.

Spaced plastic ribs 54 have edges or terminations 56 for mating with the detents 34, 36, 38 on the underside of the bottom sheet 22 thereby lending structural support to the hump shaped assembly and the interwoven foam insulation 58.

Flanges 30 interlock at edges of the units 10 with adjacent units and have grooved spacings to allow for contraction and expansion. The detents 34 allow some peripheral flexing for temperature induced dimensional changes.

Interposed within the hump of each elements 10 and adjacent the inner surface of the bottom sheet 22 is the foam insulation layer 58 being interspersed between the spaced plastic ribs 54 and the bottom sheet 22 containing the flow pathway 46.

One preferred embodiment of the element 10 provides for the PVC type layer of material to be used only on the contact surface with the solar liquid in the pathway(s) 46 of the top sheet 20 and the bottom sheet 22 and it is capable of withstanding high pressures and temperatures ranging from 190 F. to 212 F. and operating pressures of 20 psi to 45 psi. Material above identified under brand "#3206" is available and it carries UL Standards D790 for fire rating and N.S.F. recognition for potable water. The PVC material will be used in the bottom sheet 22 as a molded portion generally at a thickness of 0.100 inches to act as an insulator with baffle to direct flow and structural strengths. The other material used is a co-extruded material having a total thickness of 0.650 inches with one side to be in contact with liquid flow and may be about 0.045 inches of the "#3206" brand material with a co-lamination and co-extruded side thereof to use a weatherable formulation of a polymer compound such as branded type "GELOY #GY1120" commercially available by General Electric Company and does not carry N.S.F. recognition. This latter compound is to be used in application with dark colors as brown, red, blue, green, and to be used as weather resistance surfaces with textured dull or neutral colors and finishes. For preserving color without fading a 0.010 inch thick surface protection layer of a material such as "Korad" brand acrylic or ethylene vinyl acetate film is co-extruded as a surface layer.

The flange rim 44 may be used in either of two kinds of inlet or outlet 66 used in different ways including having a female coupler for inlet and male coupler for outlet for each collector. As shown in FIG. 4A, a reversible inlet-outlet 66 tapered as shown, has one female end 62 and a male end 60 for opposite ends of the shingle elements 10. In the presence of significant expansion and contraction due to temperature changes, the coupling of two units by a rubber O-ring assembly 75 surrounding a simple pipe extension, as shown in FIG. 4B is preferable. The flange portion of the rim 44 (FIG. 5) includes having a 0.7 inch outer diameter rim with a tapered inside diameter and outside diameter for mating at a thickness of 0.100 inch using B.F. Goodrich "#3206" brand PVC and assembled by glue or spin welding in pre-cut barrel ends. The inlets-outlets 66 are also schematically shown in FIGS. 2 and 3, etc.

Figure 6:
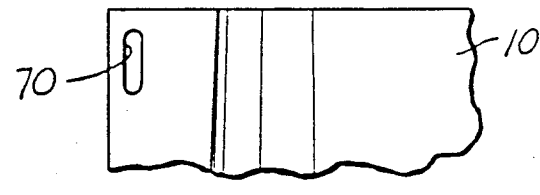
FIGS. 6 and 7A and 7B are fragmental sketches of mounting structure features.
Figure 7A:
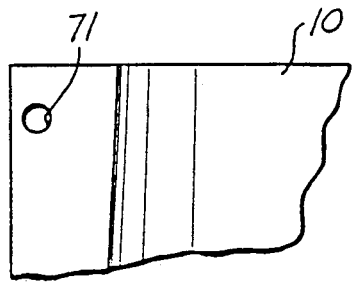
Figure 7B:
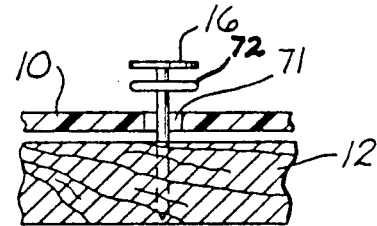

Mounting provisions of the elements 10 will require a minimum of at least three mounting holes 70, each being designed having longitudinal elongated holes (FIGS. 6) to adjust for weather variation changes as typical in Arizona. For withstanding various temperature changes without buckling or tearing, a 1.25 inch elongated hole 70 is provided where up to nine (9) collectors equal to 19.95 feet would be installed from the bottom to the top of a roof structure. An alternative round hole 71 of FIG. 7A is mounted as shown in FIG. 7B by means of nail 16 having a larger head size than the underlying rubber washer 72. This provides two dimensional movement for expansion or contraction due to temperature changes.

Structural support and insulation behind the barrel or hump radius is used to reinforce the roof structure. This will be achieved by a minimum of the two (2) plastic ribs 54 spaced apart so that two edges are in contact with the inside of the hump and meet inside of the hump spaced from the roofing structure. Insulation may preferably be a foam such as MOBRAY BADUR #605 brand surrounding plastic support within the hump and extending down to the roof structure.

Figure 8:
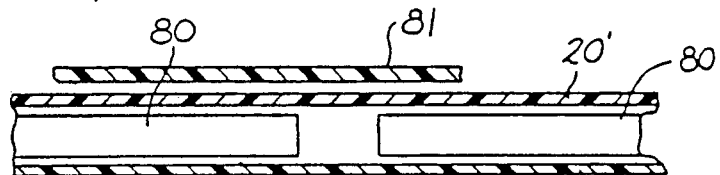
FIG. 8 is a fragmental view, partly in section of a shingle encompassing a photovoltic solar conversion cell assembly.

The shingle construction of this invention also ideally serves to incorporate a plurality of electrical or electrolytic photovoltaic solar energy cells 80 (FIG. 8), such as single silicon crystals, for maximum solar efficiency while protecting the cells from damage and wear when receiving as the roofing shingles. The upper plastic layer 20' is preferably transluscent and covered by a protective plastic surface film 81 of a heat transparent plastic that will weather well, such as said KORAD brand film. This layer may be heat welded, vacuum formed or glued. The preferred plastic sheet material is ethylene vinyl acetate of a thickness of 0.020 inch.

Figure 9:
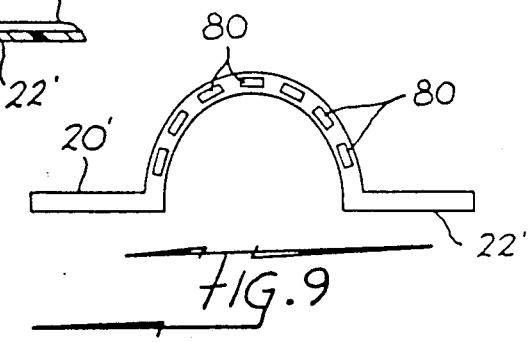
FIG. 9 is a schematic end view of a humped shingle construction of a shingle such as shown in FIG. 8.

As seen in FIG. 9, the end profile remains humped for best solar efficiency and occupies about half the shingle footprint area.

Figure 10:
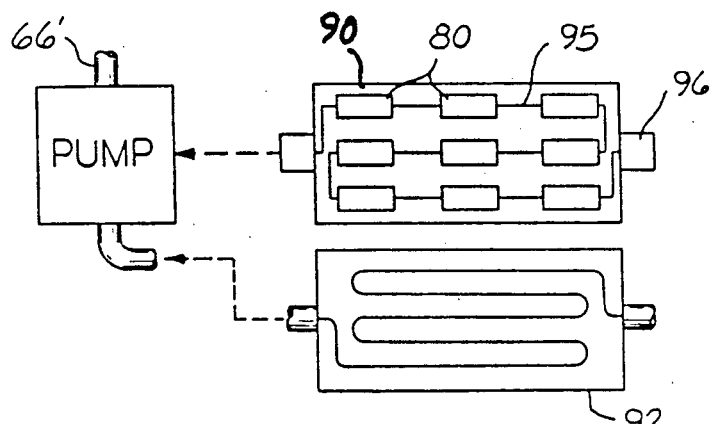
FIG. 10 is a partial schematic view of a solar system embodiment afforded by this invention utilizing both solar fluid flow shingles and photovoltaic solar conversion cells.

The compatibility of photovoltaic cell shingles and fluid flow shingles is important to solar systems, as illustrated in FIG. 10. The electrical energy of the photovoltaic unit 90 or a system of them may be used for example to drive a pump for the fluid processed by the formerly described fluid flow cells 92. The photovoltaic cells 80 are supplied with an electrical connection network 95 and end connectors 96 permitting the cells to be networked. The photovoltaic cells 80 and fluid flow cells 92 may of course be used in segregated electric or fluid processing systems without being intermixed.

It is evident that this invention has advanced the state of the art. Thus, those novel features descriptive of the spirit and nature of the invention are set forth with particularity in the following claims.

I claim:

1. A solar roofing system comprising in combination:
   a set of shingles comprising lower and upper flat plastic sheet members of extruded plastic spaced apart and sealed together to form fluid flow paths forming solar energy conversion means, the upper sheet of which is transparent to solar energy,
   interconnecting and overlapping structure for joining shingles together including structure for nailing through overlapped shingles into a roof surface, and
   means for interconnecting the solar energy conversion means comprising a flow path between said lower and upper plastic sheets for circulation of a liquid that may store heat when subjected to solar energy from a plurality of said shingles into a network for collecting accumulated solar energy.

2. The solar roofing system of claim 1 wherein the two sheets comprise co-extruded plastic sheets having welded joints therein to define said fluid flow paths.

3. The solar roofing system of claim 1 wherein the two sheets are contoured to form a humped structural formation having said interconnecting and overlapping structure comprising peripheral interconnecting edge flanges for engaging in overlapped registration the roof surface.

4. The solar roofing system of claim 3 wherein insulation means integrally supported by the lower plastic sheet is disposed between the humped formation and the roof surface.

5. The system of claim 1 with a decorative weather resistant roof covering plastic film layer affixed by co-extrusion on the outer plastic sheet surface.

6. The system of claim 1 wherein the sheets are of a polyvinyl chloride plastic material.

7. The system of claim 6 wherein the plastic sheets include an outer layer of weather resistant plastic material.

8. The system of claim 1 wherein the shingles comprise roof mounting flanges at the overlapping structure with elongated nail mounting holes therein.

9. The system of claim 1 having said fluid flow paths formed between the sheets interspersed with turbulence inducing means.

10. The system of claim 1 having structural joints formed by said overlapping structure between adjacent shingles mounted on the roof with means for permitting expansion and contraction with changes of temperature.

11. The system of claim 1 further comprising a thin film protective coating affixed to the upper sheet by co-extrusion for preventing discoloration with weathering.

12. The method of manufacturing shingles comprising the steps of:
    sealing together a top solar energy flat extruded transparent sheet with an extruded flat bottom sheet of plastic material to form therebetween a fluid flow path comprising solar energy conversion means,
    integrally forming edge base areas peripherally adjoining the energy conversion means for nailing through overlapped shingles to a roof surface, and
    shaping the shingles to present a dome like contoured structure between said edge base areas with the top sheet having greater area than the base area.

13. The method of claim 12 further comprising the step of affixing a network of foam insulation and bracing means beneath the dome like structure.

14. The method of claim 12 including the step of co-extruding at least one of the sheets from two different plastic materials to form said shingles.

15. The method of claim 12 further comprising the step of forming turbulent flow paths between the sheets for improving thermal efficiency in the flow of fluid that absorbs solar energy.

16. The method of claim 12 further comprising the step of forming expansion joints in the units at interconnecting and overlapping edge structure between adjacent shingles to compensate for variations of dimensions with changes of temperature.

17. The method of claim 12 further including the step of covering an outer surface of the top sheet by coextruding a further plastic sheet with a weather resisting color protection thin film layer.

* * * * *